United States Patent [19]

Mayeros, Jr. et al.

[11] Patent Number: 5,688,742
[45] Date of Patent: Nov. 18, 1997

[54] WATER BASED FORMATION OF A BEADED PRODUCT

[75] Inventors: William Edward Mayeros, Jr., Horsham; Fereydon Abdesaken, Dresher, both of Pa.

[73] Assignee: Rohm and Haas Company, Philadelphia, Pa.

[21] Appl. No.: 516,841

[22] Filed: Aug. 18, 1995

[51] Int. Cl.$^6$ .................................................. A01N 25/34
[52] U.S. Cl. ...................... 504/116; 71/DIG. 1; 71/64.06; 71/64.08; 424/405; 504/274; 504/339; 504/355
[58] Field of Search ........................... 504/116, 274, 504/339, 355; 71/DIG. 1, 64.06, 64.08; 424/405

[56] References Cited

FOREIGN PATENT DOCUMENTS 62-13285   6/1987   Japan.

*Primary Examiner*—Allen J. Robinson
*Assistant Examiner*—Brian G. Bembenick
*Attorney, Agent, or Firm*—Thomas D. Rogerson

[57] ABSTRACT

A method for preparing a dust-free beaded product from a low melting material is disclosed. The method is particularly applicable to manufacturing processes in which the last step in preparation of a product is a water wash step.

8 Claims, No Drawings

WATER BASED FORMATION OF A BEADED PRODUCT

BACKGROUND OF THE INVENTION

This invention is a method for preparing a beaded, free-flowing, dustless, solid product from a low melting material. More specifically, this invention relates to a method for preparing beaded technical grade agricultural chemical products.

During the production of many chemical products, particularly those with low melting points, a material is produced which forms a glassy, often sticky mass. Such a mass is difficult to package, ship, or use in subsequent production steps because it is difficult to handle. For example, such materials may form a single solid mass in a shipping container which is difficult to remove for further processing of the low melting material. These difficulties often result in increased expense and time required for subsequent processing steps. Accordingly, a need exists for methods of producing low melting point products which are in an easily handled or easily processable form.

Japanese Patent 62 132854A discloses the preparation of granulated maleimide wherein liquefied maleimide is added dropwise to a surfactant solution at least 10° C. below the melting point of the maleimide. This causes the melted maleimide to solidify. The granule size is determined by the size of the droplets. However, this process requires that the melted maleimide be carefully fed at a controlled rate (dropwise) to the surfactant solution in a second container, a time consuming procedure. In addition, this process requires two containers, one for the melted maleimide and one for the surfactant solution. We have discovered that this controlled feeding of melted material into a surfactant solution can be replaced by post-mixing agitation of a low-melting material and water in a single container.

DETAILED DESCRIPTION OF THE INVENTION

This invention is a method for forming a beaded product comprising: forming a mixture comprising a low melting material and water at a temperature above the melting point of the low melting material; mixing the mixture at a rate wherein the low melting product forms droplets within the mixture; cooling the mixture to a temperature wherein the droplets solidify forming beads; and separating the beads from the mixture. We have surprisingly found that when the mixture cools to the temperature wherein the droplets solidify, the droplets do not reform or agglomerate into a single mass. One advantage of this method is that it produces beaded products which contain very little product in the form of fine particles or dusts. The method is particularly applicable to manufacturing processes in which the last step in preparation of the product is a water wash step.

The method of this invention be applied to any low melting product which forms a solid at the temperature at which the beads will be stored. Suitable products include pharmaceuticals, agricultural chemicals, biocides, dyes, and other organic chemicals. The product may be a single ingredient or a combination of several ingredients. Agricultural chemicals which can be formed into beads using the method of this invention include fenbuconazole, myclobutanil, oxyfluorfen, and propanil.

Unless otherwise specified in this application, "low melting product" or "product" means a material or composition having a melting point below the boiling point of water, or a mixture comprising water, at whatever pressure the process is being conducted. The product will preferably have a melting point from 50° C. to 100° C.; more preferably 650° C. to 90° C. The maximum water solubility of products which can take advantage of this method is dependent on the acceptable recovery and the processing conditions used. Generally, the lower the water solubility of the product, the higher will be the recovery of beaded product. Most preferred are products which have a water solubility less than 1% by weight.

The mixture comprising the low melting product and water can be formed in a variety of ways depending on the manufacturing process being used, the available equipment, and the physical and chemical properties of the product and the mixture. The mixture may include a surfactant, particularly if a surfactant is needed to aid mixing. In cases wherein the product itself has some inherent surfactant properties, additional surfactant may not be needed. When used, the surfactant may be added to the mixture before, after, or at the same time as the water. It may also be added before, during, or after the product is melted. Preferably the surfactant is dissolved in the water prior to combining the water with the product.

The sequence used to form the mixture is not critical. The components may be combined in any order at any temperature below the boiling point of the water or water/surfactant solution. If the components are combined at a temperature below the melting point of the product, the mixture is then heated until the product melts. Preferably the water is added to melted product. Most preferably, when added, the water is at a temperature equal to or greater than the temperature of the melted product. The ratio of the components of the mixture will depend upon the physical/chemical properties of the components (including impurities), the product manufacturing process, the capabilities and capacities of the equipment being used, and the desired recovery of beaded product. Determining acceptable ratios can be accomplished with a minimum of experimentation for one familiar with the product and its manufacturing process.

A variety of agitation processes may be employed to mix the formed mixture. Acceptable processes include stirring, shaking, and tumbling. Agitation by stirring is preferred. The agitation rate is important in determining the ultimate size of the beads produced by the process. The rate should be sufficiently high so as to form droplets of product in the mixture but not so high that an emulsion is formed. Thus, the rate will be dependent on the particular product, the ratio of product to water and, when used, surfactant, the temperature, and the processing equipment employed. The appropriate rate is easily determined with a minimum amount of experimentation by one skilled in the art. Generally, as the rate is increased, the beads become smaller. Even so, the preferred rate is the highest rate which does not produce an emulsion or smaller than desired beads. Once the beads solidify, agitation is normally reduced or stopped altogether.

The rate used for cooling of the mixture to form beads is not critical. In order to keep processing time to a minimum, the fastest cooling rate permitted by the processing equipment used is preferred. The most important determining factor for this rate is normally the cooling capacity of the equipment.

Once beads are formed they can be separated from the other components of the mixture using any standard technique for separating solids from liquids. Separation by filtration, centrifugation, or decanting are preferred techniques; filtration or centrifugation are most preferred. A combination of these techniques may also be employed depending on the particular available processing equipment and their capacities.

The following examples describe in detail some of the embodiments of this invention.

EXAMPLE 1

Preparation of Beaded Technical Oxyfluorfen

Oxyfluorfen technical (95% pure, 400 g, melting point approximately 85° C.) was melted and then combined with hot water (1200 ml, temperature greater than 85° C.) while stirring using an overhead agitator. Triton® X100 non-ionic surfactant was added. Heating was discontinued and the mixture was allowed to cool with continued stirring. Solid beads formed which were isolated using vacuum filtration.

EXAMPLE 2

Preparation of Beaded Technical Oxyfluorfen

Oxyfluorfen technical (95% pure, 300 g, melting point approximately 85° C.) was melted and then combined with hot water (900 ml, temperature greater than 85° C.) while stirring using an overhead agitator. Triton® X100 non-ionic surfactant (0.25 g) was added. Heating was discontinued and the mixture was cooled using an ice bath with continued stirring. Solid beads formed which were isolated using vacuum filtration.

EXAMPLE 3

Preparation of Beaded Technical Propanil

Propanil technical (approximately 98% pure, 70 g, melting point 85°–88° C.) was combined with hot water (140 ml, temperature greater than 85° C.) while stirring using an overhead agitator. The mixture was heated to 88° C. at which time Triton® X100 non-ionic surfactant (1.4 g) was added. Heating was discontinued and the mixture was allowed to cool with continued stirring. Solid beads formed which were isolated using vacuum filtration. The beads were dried for 4 hours in a vacuum oven yielding 67.35 g of dried beads (96.2% recovery).

I claim:

1. A method for forming a beaded product comprising:
   a. forming a mixture comprising a low melting product having water solubility and water at a temperature above the melting point of the low melting product;
   b. mixing the mixture at an agitation rate wherein the low melting product forms droplets within the mixture;
   c. cooling the mixture to a temperature wherein the droplets solidify forming beads; and
   d. separating the beads from the mixture.

2. The method of claim 1 wherein the forming step comprises:
   a. melting the low melting product;
   b. adding a solution comprising water to the melted product.

3. The method of claim 1 wherein the mixture further comprises a surfactant.

4. The method of claim 2 wherein the solution further comprises a surfactant.

5. The method of claim 2 wherein the temperature of the solution is at least the temperature of the melted product.

6. The method of claim 1 wherein the low melting product is an agricultural chemical.

7. The method of claim 6 wherein the low melting product is selected from fenbuconazole, myclobutanil, oxyfluorfen, and propanil.

8. The method of claim 1 wherein the water solubility of the low melting product is less than 1% by weight.

* * * * *

UNITED STATES PATENT AND TRADEMARK OFFICE
CERTIFICATE OF CORRECTION

PATENT NO. : 5,688,742
DATED : November 18, 1997
INVENTOR(S) : William Edward Mayeros, Jr., et al.

It is certified that error appears in the above-identified patent and that said Letters Patent is hereby corrected as shown below:

Col. 2   Line 2    Remove "650°" and insert --65°--.

Col. 4   Line 10   Insert --low-- after the word "having".

Signed and Sealed this

Twenty-ninth Day of September, 1998

Attest:

BRUCE LEHMAN

*Attesting Officer*              *Commissioner of Patents and Trademarks*

(12) EX PARTE REEXAMINATION CERTIFICATE (5089th)
United States Patent
Mayeros, Jr. et al.

(10) Number: US 5,688,742 C1
(45) Certificate Issued: Mar. 22, 2005

(54) WATER BASED FORMATION OF A BEADED PRODUCT

(75) Inventors: William Edward Mayeros, Jr., Horsham, PA (US); Fereydon Abdesaken, Dresher, PA (US)

(73) Assignee: Rohm and Haas Company, Philadelphia, PA (US)

Reexamination Request:
No. 90/005,067, Aug. 12, 1998

Reexamination Certificate for:
Patent No.: 5,688,742
Issued: Nov. 18, 1997
Appl. No.: 08/516,841
Filed: Aug. 18, 1995

Certificate of Correction issued Sep. 29, 1998.

(51) Int. Cl.⁷ .................. A01N 25/12; A01N 25/34; A01N 31/14; A01N 37/22; A01N 43/653
(52) U.S. Cl. .................. 504/339; 504/352; 504/360; 504/367; 71/64.06; 71/64.08; 71/64.13; 424/405; 424/489; 514/383
(58) Field of Search ................ 504/339, 352, 504/363; 514/383; 23/295 R, 296, 300

(56) References Cited

U.S. PATENT DOCUMENTS 5,718,733 A * 2/1998 McLaughlin .............. 23/295 R

FOREIGN PATENT DOCUMENTS

| DE | 1 229 501 | | 5/1962 |
| EP | 0 221 465 | * | 5/1987 |
| EP | 0 548 028 | * | 6/1993 |

* cited by examiner

*Primary Examiner*—S. Mark Clardy

(57) ABSTRACT

A method for preparing a dust-free beaded product from a low melting material is disclosed. The method is particularly applicable to manufacturing processes in which the last step in preparation of a product is a water wash step.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *